April 3, 1928.
F. G. BREYER ET AL
1,664,767
ZINC OXIDE
Filed June 18, 1925
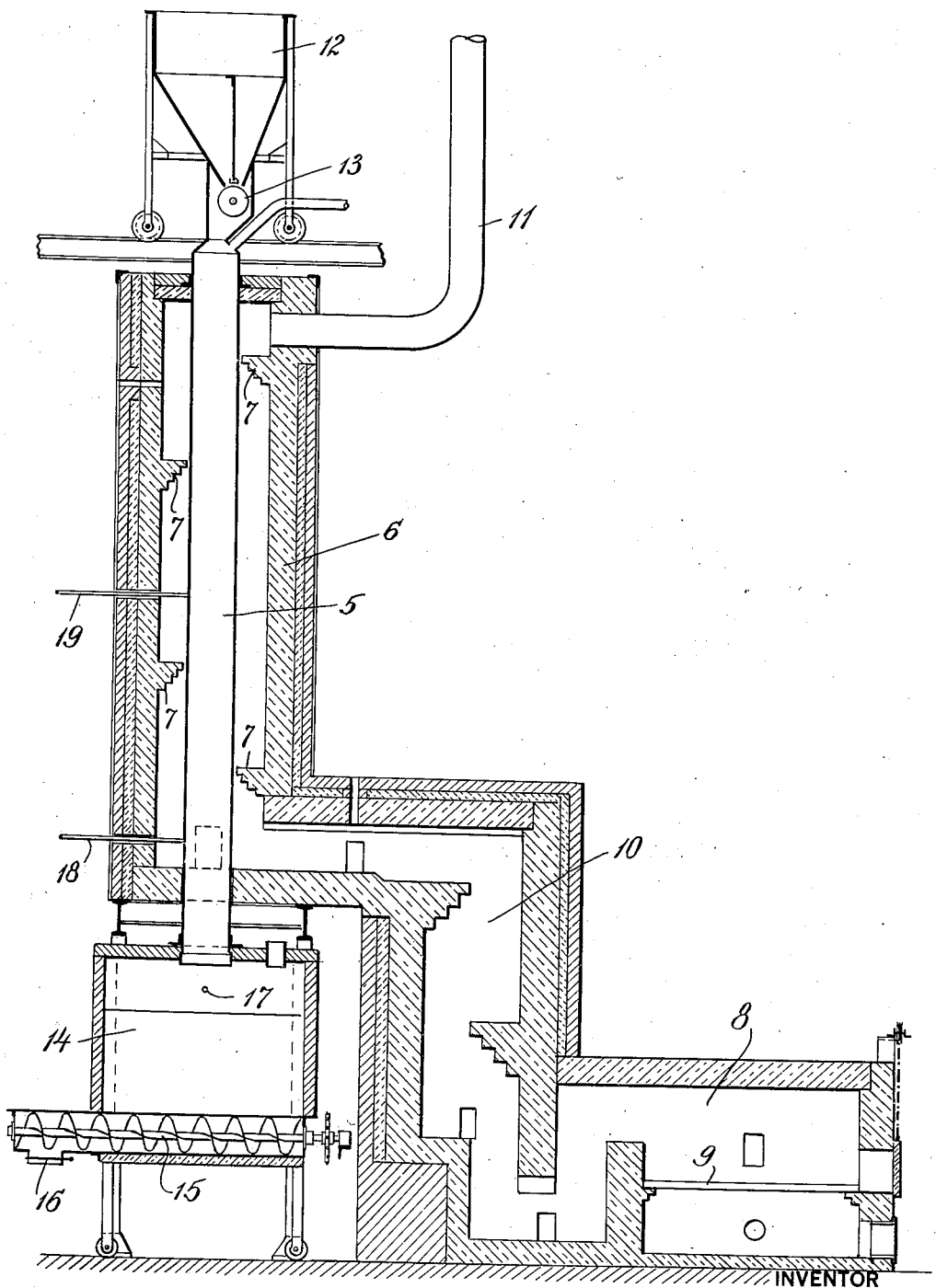
INVENTOR
Frank G. Breyer
Earl H. Bunce and
BY John H. Weikel
Pennie Davis Marvin + Edmonds
his ATTORNEYS Patented Apr. 3, 1928.

1,664,767

UNITED STATES PATENT OFFICE.

FRANK G. BREYER, EARL H. BUNCE, AND JOHN H. WEIKEL, OF PALMERTON, PENNSYLVANIA, ASSIGNORS TO THE NEW JERSEY ZINC COMPANY, OF NEW YORK, N. Y., A CORPORATION OF NEW JERSEY.

ZINC OXIDE.

Application filed June 18, 1925. Serial No. 37,902.

This invention relates to the treatment of zinc oxide, and particularly to a method of accelerating the aging of this product.

Zinc oxide is used to a large extent in preparing rubber compounds, having the advantage of increasing the tensile strength of such compounds to a material extent. The oxides best adapted for this purpose are those derived from ores such as franklinite. Zinc oxides prepared from roasted sulphide ores do not, if used in their original condition, produce so marked an increase in tensile strength in the rubber compound. The reason for this difference in the action of zinc oxides from different sources is somewhat obscure but it seems to depend upon the relative acidity of the product although it is by no means certain that the acidity is the primary cause of the difference. Acidity seems to be rather an index of the condition of the oxide.

It is the object of the present invention to provide a method of treating zinc oxides especially those produced from roasted sulphide ores whereby such oxide is improved for use in the rubber compounds. By the treatment described it is possible to modify zinc oxide derived from roasted sulphide ores so that it causes substantially the same effect in rubber compounds as zinc oxide produced from franklinite and similar ores.

Further objects and advantages of the invention will be apparent as it is better understood by reference to the following specification and accompanying drawing which illustrates diagrammatically the preferred form of apparatus for carrying out the method. The treatment need not be conducted, however, in an apparatus of the type illustrated since it depends upon the conditions to which the material is subjected rather than to the particular manner in which it is handled.

We have discovered that zinc oxide can be aged rapidly and improved particularly with reference to its effect in rubber compounds by subjecting it in a heated condition to the action of steam. The best results are obtained when the temperature of the oxide does not exceed 150° C. and a temperature of approximately 125° C. is preferred. When the oxide is treated with steam at about the temperature mentioned the acidity of the product is reduced materially. Furthermore the product when compounded with rubber will produce in the rubber a tensile strength of upwards to 3000 pounds per square inch which is comparable with the results obtained by compounding rubber with zinc oxide derived from franklinite ores.

To obtain the best results it is essential that the zinc oxide product finally have a comparatively low moisture content. Consequently the operation must be carried out under conditions which preclude substantial retention of the steam in the zinc oxide or the latter must be retreated after subjecting it to the action of steam to remove a large proportion of the moisture content.

This may be accomplished readily by provision of a vertical tube of iron or other suitable material which can be heated throughout its length to a sufficient extent by means of combustion gases or otherwise to ensure the heating of the zinc oxide to approximately 140° C. while it is falling through the tube. The zinc oxide may be fed regularly to the top of the tube and in falling therethrough will acquire the necessary temperature. At the bottom of the tube a chamber may be provided in which the zinc oxide collects and where it is subjected to the action of steam introduced at a temperature of slightly above 100° C. Additional steam may be introduced also in the tube where it mingles with the descending zinc oxide although this is not essential. The treated oxide collecting in the chamber at the bottom of the tube can be removed regularly by the provision of a suitable conveyor which operates continuously to withdraw a portion of the product. The chamber should be of sufficient size to maintain a considerable body of the oxide therein so that all of the oxide remains in contact with the steam for a sufficient period to accomplish the purpose of the invention, that is to say, for several hours.

Under certain conditions the single passage of the zinc oxide through the tube and contact with the steam will produce the desired improvement. If the oxide accumulates more moisture than is desirable in the finished product it can be further improved by repassing it through the tube and chamber in the absence of steam. Thus a single tube can be operated intermittently, first with steam while the oxide is passing therethrough and then without the steam to dry the oxide, or a plurality of tubes can be used so that the product treated in the first tube with steam is afterwards subjected to the action of heat in a similar tube to which no steam is admitted. Alternatively, the chamber at the bottom of the tube can be provided with heating coils so that the temperature of the zinc oxide therein is maintained above 100° C. and moisture is thereby prevented from condensing. Instead of using a second tube for drying or applying heating means in the chamber at the bottom of the tube the drying can be accomplished in any suitable way, for example, by the provision of a belt conveyor upon which the zinc oxide is discharged from the chamber and over which a current of drying gas such as heated air is passed. Any other suitable form of drying means can be substituted to ensure a reduction of the moisture content of the oxide to a point below four tenths of one per cent which is the preferred upper limit for moisture in zinc oxide which is to be used in compounding rubber.

The single figure of the drawing is a vertical section of the apparatus which can be used to carry out the process.

Referring to the drawing, 5 indicates the tube which is upright in a suitable stack 6 of brick work having baffles 7 to ensure the maximum effective use of the heating gases. The tube may be made of wrought iron approximately twelve inches in diameter and eighteen feet in length. The dimensions are, of course, optional depending upon the desired capacity of the unit. It is heated by a furnace 8 having a grate 9 to support coal or other combustible material. Any other suitable means for providing combustion gases may be utilized. These gases are conveyed through a flue 10 to the stack 6 and after circulating about the tube 5 the gases escape through a chimney 11. To ensure heating of the zinc oxide in the tube to a temperature of approximately 140° C. during its passage therethrough, the temperature of the gases surrounding the tube should be approximately 250° C.

The zinc oxide to be treated is fed to the top of the tube from a hopper 12 through a roll feed 13 which ensures uniform feeding and distribution of the oxide so that it will fall through the tube in a regular manner. The oxide showers through the tube and in its heated condition descends into a chamber 14 which communicates with the tube at its bottom. The chamber is provided with a screw conveyor 15 which may be driven from any suitable source of power so that a portion of the oxide at the bottom of the chamber is withdrawn continuously and delivered through an outlet 16. From this outlet the treated zinc oxide can be delivered directly into a box or other suitable receptacle or onto a conveyor which will deliver it to another heating unit or convey it to the top of the tube so that it can be retreated. A steam inlet 17 enters the side of the chamber to permit the continuous introduction of steam at the desired temperature above the layer of zinc oxide therein. The steam rises, of course, and contacts with the descending shower of zinc oxide in its heated condition. It also contacts with the surface layer of zinc oxide in the chamber. Additional steam inlets 18 and 19 may be provided to admit steam to the tube at different levels and all of the inlets may be controlled by suitable valves to permit regulation of the steaming operation.

In an apparatus of the kind and of the dimensions described it is possible to treat 12,000 pounds or more of zinc oxide per day and to reduce the acidity of the zinc oxide from an average of .57 per cent to an average of .11 per cent the reduction in acidity is accompanied by such changes in the oxide as to improve its compounding properties with rubber so that the oxide which before treatment will produce a rubber compound having a tensile strength of 1350 to 2500 pounds per square inch will, after treatment, produce a compound having a tensile strength of from 2700 to 3000 pounds per square inch. The zinc oxide although derived from roasted sulphide ores has after treatment substantially the same characteristics and will produce rubber compounds having substantially the same strength as those produced with zinc oxide derived from franklinite and similar ores and which are free from the acidity which characterizes zinc oxide produced from roasted sulphide ores. By the practice of the method it is possible, therefore, to materially increase the available supply of zinc oxide for rubber compounding purposes.

As indicated in the foregoing specification various changes may be made in the details of operation and particularly in the apparatus employed therefor without departing from the invention or sacrificing any of the advantages thereof. For example, the oxide coming from the bag houses either in bulk or in the collecting bags may be passed through a horizontal tunnel treater by means of a conveyer or on trucks or cars.

We claim:—

1. The method of improving zinc oxide for rubber compounding use, which comprises subjecting the oxide at a temperature of from 125° to 150° C. to the action of steam and maintaining the temperature of the oxide to prevent substantial condensation of the steam therein.

2. The method of improving zinc oxide for rubber compounding use, which comprises heating the oxide to a temperature of not substantially exceeding 150° C. in the presence of steam.

3. The method of improving zinc oxide for rubber compounding use, which comprises reducing the acidity of the oxide by the action of steam.

4. The method of improving zinc oxide for rubber compounding use, which comprises steaming the oxide at a temperature between 100° and 150° C.

5. The method of improving zinc oxide for rubber compounding use which comprises passing the oxide through a tunnel furnace on a conveyor, said tunnel furnace having a heated zone filled with steam at a temperature between 125° and 150°.

In testimony whereof we affix our signatures.

FRANK G. BREYER.
EARL H. BUNCE.
JOHN H. WEIKEL.